(12) United States Patent
Nassar

(10) Patent No.: US 7,334,077 B2
(45) Date of Patent: Feb. 19, 2008

(54) METHOD AND APPARATUS FOR SMART MEMORY PASS-THROUGH COMMUNICATION

(75) Inventor: Sami Nassar, Campbell, CA (US)

(73) Assignee: Renesas Technology America, Inc., San Jose, CA (US)

(*) Notice: Subject to any disclaimer, the term of this patent is extended or adjusted under 35 U.S.C. 154(b) by 653 days.

(21) Appl. No.: 10/688,519

(22) Filed: Oct. 17, 2003

(65) Prior Publication Data

US 2005/0086421 A1 Apr. 21, 2005

(51) Int. Cl.
*G06F 12/00* (2006.01)

(52) U.S. Cl. .................. 711/100; 707/6; 711/167

(58) Field of Classification Search ............ None
See application file for complete search history.

(56) References Cited

U.S. PATENT DOCUMENTS 6,112,319 A * 8/2000 Paulson .................. 714/49

* cited by examiner

*Primary Examiner*—Jasmine Song
(74) *Attorney, Agent, or Firm*—Townsend and Townsend and Crew LLP

(57) ABSTRACT

Enhanced functionality is provided in memory devices by enhancing the control logic to recognize predetermined data sequences. Standard (legacy) device operations are used to communicate the predetermined data sequences, thereby allowing existing device drivers to be used with the enhanced devices.

50 Claims, 7 Drawing Sheets

METHOD AND APPARATUS FOR SMART MEMORY PASS-THROUGH COMMUNICATION

BACKGROUND OF THE INVENTION

The present invention is generally directed to memory access, and in particular to accessing data storage devices with enhanced functionality.

Memory devices (e.g., disk drives, flash cards, etc.) are increasingly requiring extended command sets to provide enhanced functionality and specialized features. For example, many applications for memory devices require encryption services, extended access/ownership capability, copyright information, leasing and other time based parameters, and so on. The term memory device is meant to encompass a broad range of devices for storing data, and will be used interchangeably with data storage device throughout the discussion which follows.

FIG. 6 shows aspects of a conventional system architecture for memory devices. A memory device 602 is typically connected to a host device 612 via a suitable interface 604 (e.g., bus, slot, etc.). The interface 604 represents both the pinouts or connectors provided in the memory device, and the bus or slot that is provided in the host device to which the memory device is connected. Conventionally, a memory device includes a memory component 622, and control logic 624 which provides an interface to the memory component. The memory component can be semiconductor memory, magnetic memory, and or optical memory, depending on the type of memory device. For example, a flash memory device typically comprises a semiconductor memory as the memory component 102. A disk storage memory device typically employs magnetic media as the memory component 102. Optical storage technologies are a relatively new technology for disk storage memory devices where the memory component comprises, for example, magneto-optical media.

Software on the host side 612 typically comprises one or more host applications 600 executing on top of an operating system (OS) 608. Typically the host applications make various system calls into the OS. Some of the system calls involve accessing the memory device 602. Higher level functionality can be provided to an application via an application programmer's interface (API) 664.

The OS 608 includes a set of device drivers (device driver library) 606 for I/O with the memory device 602. The device drivers set up the data that is sent to the device to perform certain tasks. This might include writing a command selected from the command set of the device to a command register in the device. Device driver function calls 662 are the software interface between the OS and the device drivers. OS system calls which access a device are implemented via the device drivers. Though many I/O operations with a device are common among memory devices (e.g., read, write), each type of a particular kind of device (e.g., flash memory, RAM, static RAM) typically operates differently from other types of devices, so that different device drivers may be needed for each type of device. Moreover, one kind of memory device (e.g., disk drive storage) might have different kinds of operations (e.g., seek) not found on other kinds of devices (e.g., flash memory). Thus, device drivers are written specifically for each device for operation with a particular device.

Adding new functionality to enhance an intelligent memory device conventionally means extending the existing command set of a device to include new commands for accessing the new functions. This typically requires the addition of extended capability across multiple components of the system architecture. Consider the addition of a new feature(s), e.g., data encryption, in the memory device 602. First, the command set of the device must now include one or more additional commands for the new feature. This includes providing processing capability 632 or other suitable logic to perform the new feature. Extended control logic 634 is typically required in the memory device to provide access to the new feature. For example, the extended control logic can implement an extension of the device's command set, allowing access to the new feature. In order to access the extended command set, new or modified device driver code 633 must be written. The new device drivers might comprise modifications of existing drivers, or maybe even the addition of completely new drivers if the feature is completely new functionality in the device. The device driver function calls 662, likewise may have to be modified along with corresponding modifications in the OS to accommodate the modified drivers.

The API 664 may have to be expanded to provide access to the new functionality. This might involve new API calls if the feature is completely new to the device. And of course, new application code 631 must be included in the host applications 600 to use the added functionality of the memory device.

Host devices 612 are built on a variety of processing hardware and software platforms. Device drivers for an OS running on one hardware platform are likely to be different from the device drivers for the same OS running on another hardware platform. Conversely, the device drivers written for an OS running on a given hardware platform are likely to be different from the device drivers written for a different OS running the same hardware platform. In fact, different device drivers may be needed on the same software/hardware platform if different slot hardware is used (e.g., PocketPC).

Device drivers are platform specific, and sometimes within a platform, a different device driver is needed based on the components installed. Device drivers therefore have to be modified; and in many instances, the OS needs to be extended. The constant development, rewriting, and testing of device drivers typically results in a business decision to support only a few platforms because of the time and expense that must be invested for new drivers.

Though software development technology exists to facilitate the addition of an extended command set to a memory device, device driver source code and build environments are hard to procure, and having to do so for multiple environments complicates the problem. There are vendors who provide solutions for writing portable device drivers. However, the availability of robust solutions, and the widespread adoption of these solutions has not yet been realized, especially in the memory card space. Moreover, device drivers operate at the OS level and thus have access to vital aspects of the operating environment. It is therefore easy to "break" the entire system if a device driver is not properly written. Due to the dependence on too many vendors to bring a technology to market, there is a delay in the delivery of new memory device technologies to the consumer; and in some cases the new technology may never migrate to certain platforms.

SUMMARY OF THE INVENTION

The present invention provides a mechanism in the memory device to use a "memory location window," where extended commands can be accessed in the same way that normal memory is written. The present invention enables additional features to be added to memory devices without requiring modifications to the device drivers. Standard device drivers can then be used.

BRIEF DESCRIPTION OF THE DRAWINGS

Aspects, advantages and novel features of the present invention will become apparent from the following description of the invention presented in conjunction with the accompanying drawings in which.

DESCRIPTION OF THE SPECIFIC EMBODIMENTS

Figure 1:
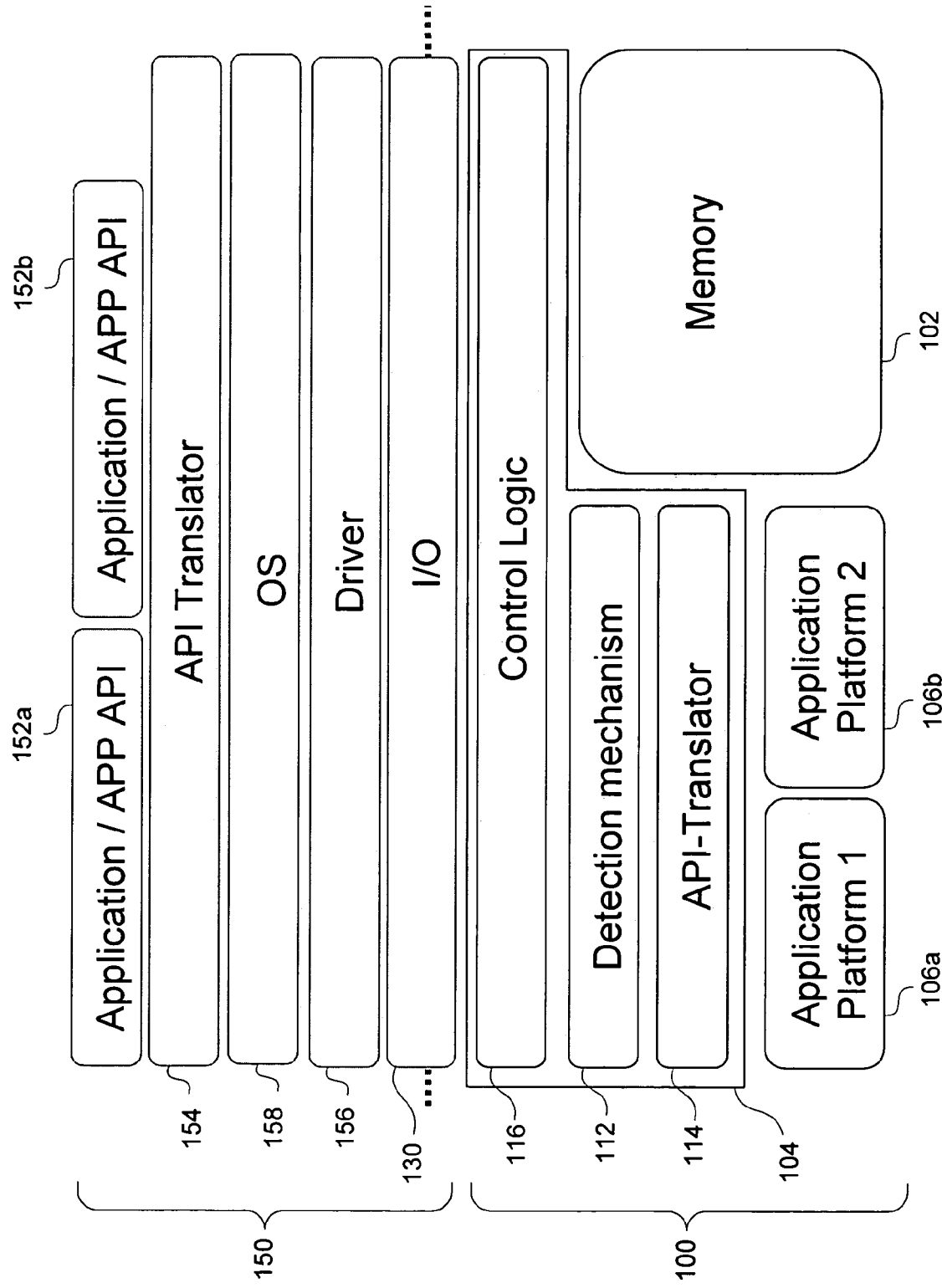
FIG. 1 shows a high level functional block diagram of an illustrative embodiment of the present invention.

FIG. 1 is a high level generalized block diagram of an illustrative embodiment of the present invention. The figure shows a memory device 100 and a host device 150. The host device can be any data processing component that can be connected to memory. Typical host devices include personal computers (PCs), laptop computers, personal data assistants (PDAs), mobile telephones (cell phones), and so on. The memory device can be any intelligent data storage device that can be enhanced with additional functionality. For example, secure device (SD) memory cards can be enhanced with additional security functionality such as public/private key encryption techniques. Other memory card formats can be similarly enhanced; for example, compact flash (CF) and other flash memories, multi-media cards (MMC), micro-drive technology storage devices, and so on. The present invention is applicable to mass storage devices as well; for example hard disk drive units, removable/portable hard disk drives, and such. One of ordinary skill will recognize the variety of data storage device technologies that can be adapted in accordance with the present invention.

Figure 2A:
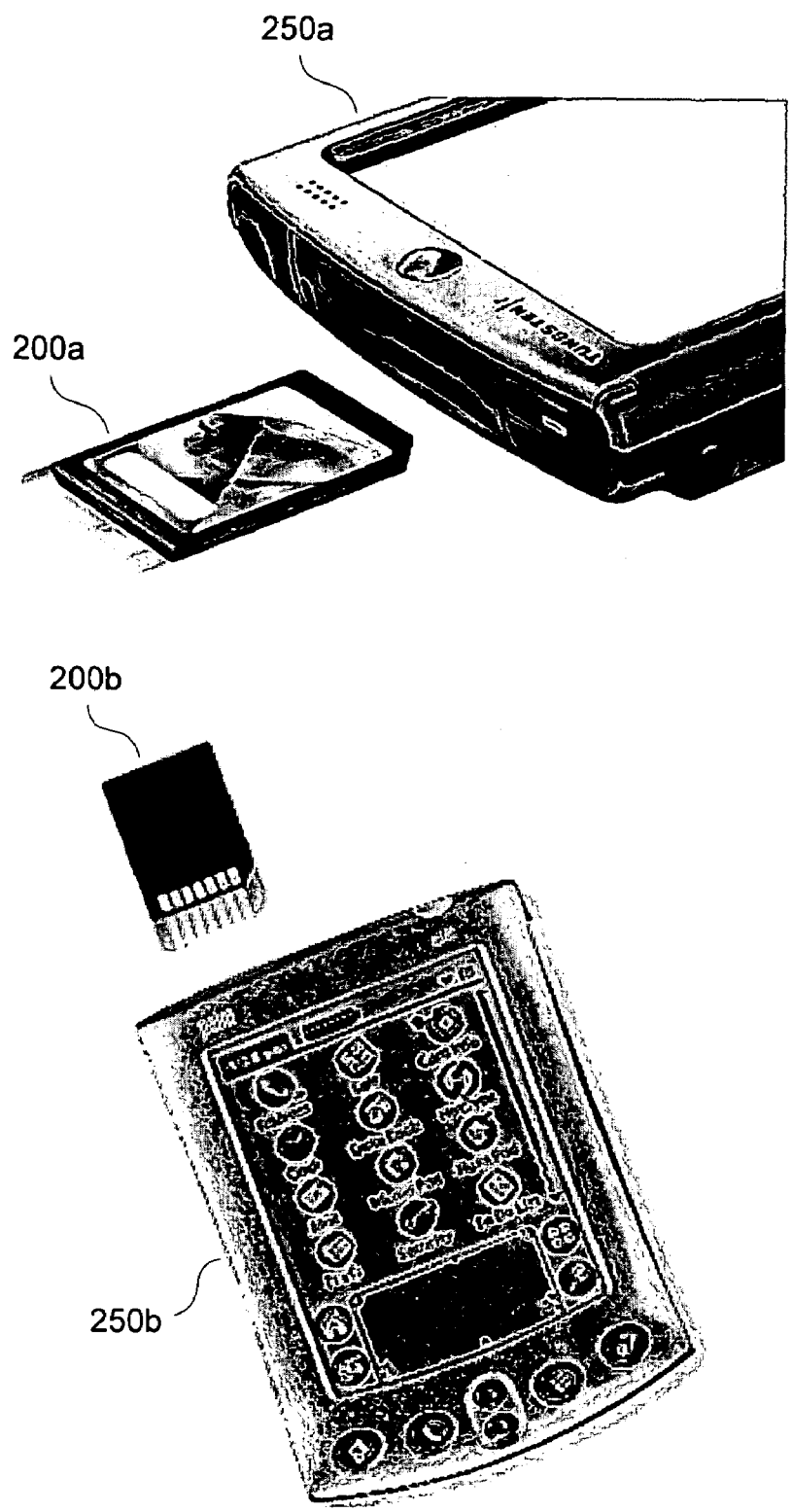
FIGS. 2A and 2B show a sampling of various uses of a memory device of the present invention.
Figure 2B:
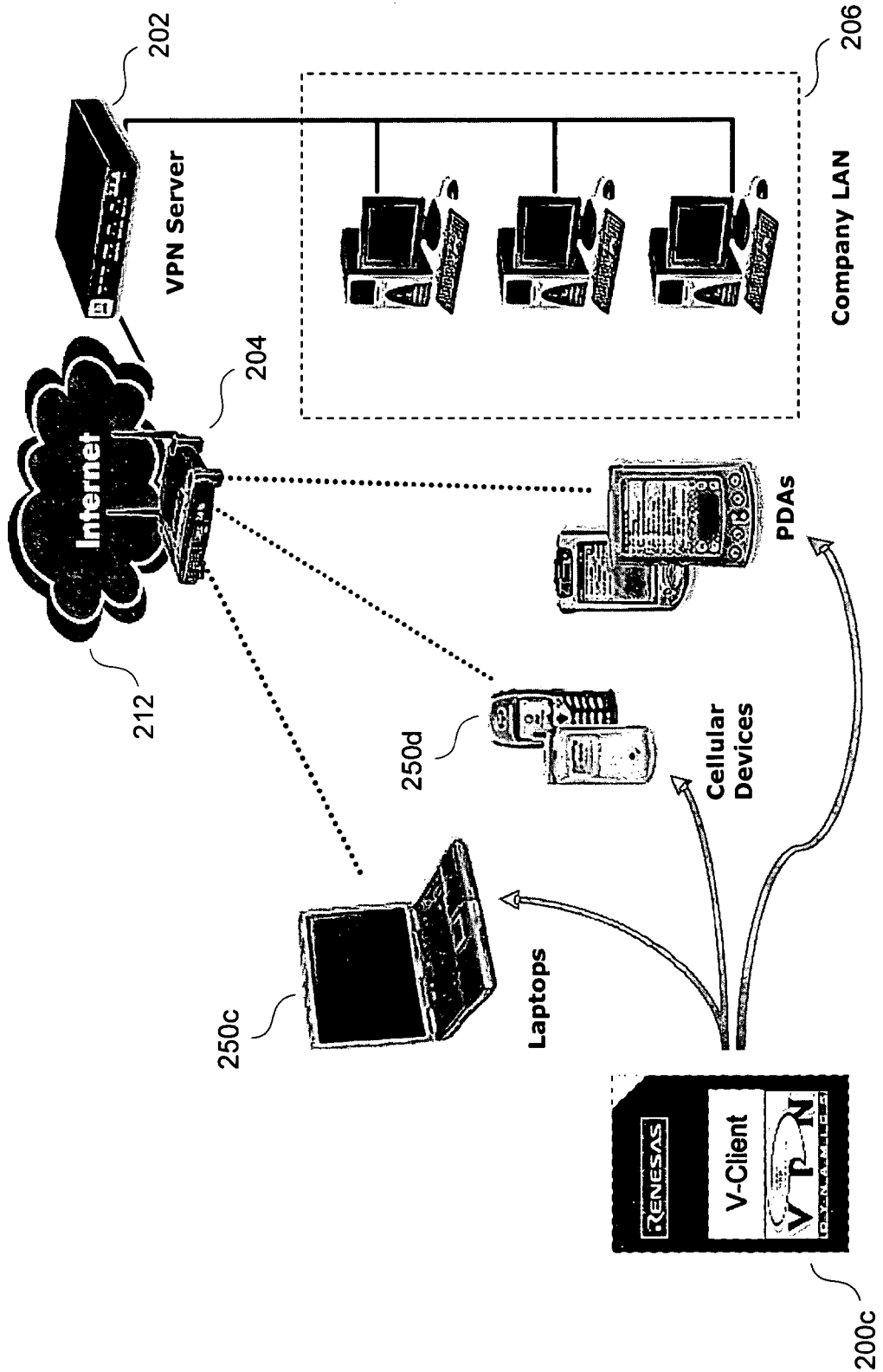

An I/O interface 130 provides the physical connectivity between the host device 150 and the memory device (data storage device) 100. The interface 130 represents both the pinouts or connectors provided in the memory device, and the bus or slot that is provided in the host device to which the memory device is connected. The interface provides a data path for data communication between the host device and the memory device. In a PC architecture, the I/O interface might be a slot for an expansion card, or some other suitable interface; e.g., universal serial bus (USB), fire wire connection, etc. In the case of removable memory cards, the I/O interface represents the slot into which the memory devices are plugged. FIG. 2A show two personal data assistants (PDA's) 250a, 250b as examples of typical host devices. The PDA's employ different slot hardware to accommodate memory cards 200a, 200b with different form factors. FIG. 2B shows additional examples of host devices, including a laptop computer 250c and mobile (cellular) telephones 250d. The memory card 200c shown in the figure provides virtual private network (VPN) client functionality to the host devices, allowing connection to a VPN server 202 over a wireless link with a wireless base station 204 on a suitable network 212.

Returning to FIG. 1, a host device 150 comprises typical hardware (not shown) including a suitable data processing component (e.g., CPU, microcontroller, etc.), memory (e.g., ROM, RAM), and appropriate support logic. The host device further comprises one or more applications 152a, 152b that execute on the underlying hardware to provide services and functions. An API translator 154 is a software component provided in accordance with the particular embodiment of the invention shown in the figure, and will be discussed below.

The host applications 152a, 152b typically execute on top of a suitable operating system (OS) 158. The OS includes device drivers 156. The device drivers communicate or otherwise interact via the I/O interface 130 with a device on behalf of the higher level host applications to perform certain tasks required of the device. The API translator layer 154 provides an API for accessing the enhanced functionality provided by the storage device. It can be appreciated that the API calls do not replace the function calls that are conventionally provided by the underlying OS layer, but simply add to the set of function calls that are available for the development of the host application.

The "devices" in the present invention are various forms of the foregoing mentioned intelligent data storage devices, and is represented in FIG. 1 as memory device (data storage device) 100. In accordance with the present invention, the embodiment exemplar of the memory device shown in FIG. 1 comprises a memory 102, a controller 104, and one or more application platforms 106a, 106b. The memory 102 can be any kind of memory that is appropriate for the device. For example, the memory can be flash memory. The memory can be magnetic media, as in the case of disk drives or micro-drives.

The controller 104 comprises three functional components: control logic 116, a detection mechanism 112, and a handling mechanism (API translator) 114. One of ordinary skill will readily appreciate that for any given implementation of the present invention, these components may or may not be organized as shown in FIG. 1. The constituent components of the controller 104 are illustrated simply to explain the operation of a memory device that embodies various aspects of the invention. The control logic 116 represents the logic that is typically found in conventional memory devices to provide access to the memory 102.

The controller 104 comprises a detection mechanism 112. In accordance with the invention, the detection mechanism monitors data that is sent to the memory device 100 by the host device 150 and detects certain data patterns. In a particular embodiment of the present invention, the detection mechanism comprises logic which monitors commands that are sent to the memory device, and in particular responds to write commands in which the write data contain a specific pattern of data. The detection mechanism can be state machine that parses a data stream, looking for a specific data pattern.

The controller 104 further comprises a handling mechanism 114. In accordance with the invention, the handling mechanism accesses functions provided by the one or more application platforms 106a, 106b in response to the detection mechanism 112.

The enhanced functionality of the memory device is provided by one or more application platforms 106a, 106b. These elements represent the logic that implement the additional functionality in an enhanced memory device. In one implementation, for example, a smart card chip might constitute an application platform to provide data encryption services. A second smart card chip might constitute another application platform to provide VPN client services. Alternatively, the application platforms 106a, 106b shown in the figure can represent different processes running on a single processing device.

Figure 3:
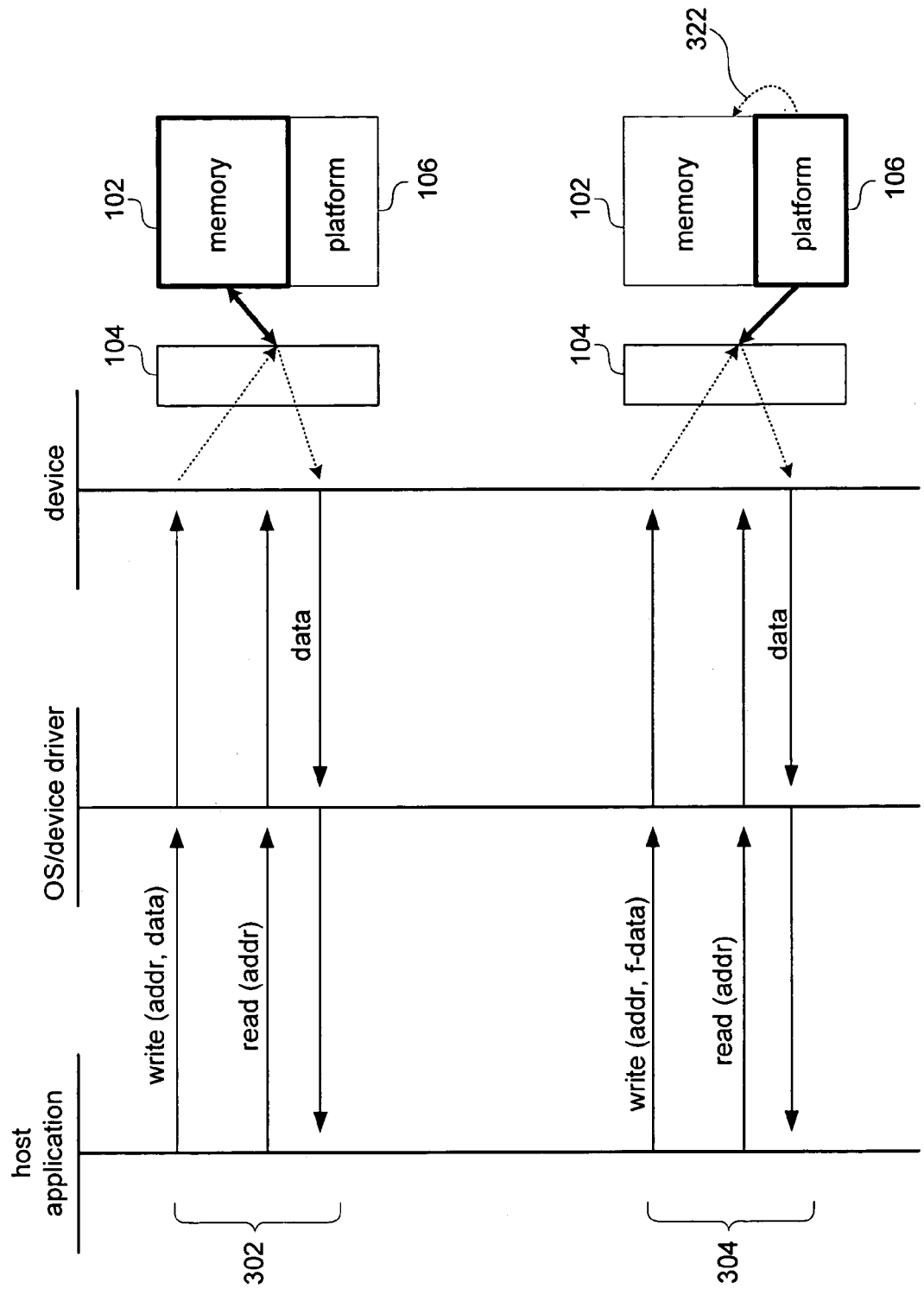
FIG. 3 illustrates an embodiment of the present invention, showing communication sequences for accessing an enhanced memory device.

Referring to FIG. 3, a basic data access model for I/O operations between the host application and the device comprises simple read and write operations. Here, a host application 152a, 152b specifies a memory location to which data is be written, or a memory location from which data is to be read. An OS that supports this kind of low level I/O simply makes corresponding calls to the device drivers; e.g., _write(), _read(). The device drivers then perform the actual work of communicating with the device to set up the specified I/O operation and execute the operation.

Thus in a typical I/O sequence 302, for example, a conventional write operation to a memory location is shown. This includes an address indicating the memory location, ADDR, accompanied by some DATA. An OS that supports this type of low level write operation from a host application 152a, 152b may simply call a corresponding data write routine in the device driver library, specifying the address ADDR and the DATA. The ADDR and DATA is then "sent" to the device. The specifics of communicating the address and data to the device varies from one device to another. For example, in a memory device, the ADDR might be strobed onto an address bus, followed by strobing DATA onto a data bus.

In the memory device, a detection mechanism 112 in the controller 104 "looks" for a predetermined data sequence. It is assumed for discussion purposes that the DATA in the write operation in the I/O sequence 302 does not include a predetermined data sequence, and so the controller will simply perform a write operation of the DATA beginning at a location in the memory component 102 indicated by ADDR. The bold arrow shows the data flow into the memory component. The controller typically provides some form software and/or hardware handshaking with the device drivers to indicate a successful write operation or a failed write-attempt.

Suppose now that the next operation in the sequence 302 is a read operation. Typically, a read operation involves specifying an address, ADDR, whether explicitly or implicitly (e.g., via the address of a previous I/O operation). The OS may simply call a corresponding data read routine in the device driver library to effect a read operation on the device. FIG. 3 shows that the read operation accesses the specified location in memory 102 and returns the data beginning at that memory location. It is noted that a read operation can include a parameter to specify the number of data units (bytes, words, etc) to be read out. This parameter is can be specified by the host application 152a, 152b, or by the OS. For example, for block I/O, the OS might specify a fixed size block of data.

Next, consider the I/O sequence 304. A conventional write operation to a memory location is shown; i.e., an address component ADDR and a data component F-DATA are provided as in the I/O sequence 302. However, in accordance with this aspect of the invention, the data (F-DATA) includes a predetermined sequence of data referred to herein as a "flag." The F-DATA sequence can include an extended command component in addition to the flag component; thus:

$$F\text{-}DATA = <\text{flag}><\text{extended command}>$$

The OS again simply calls the data write routine in the device drivers, using the address parameter ADDR and the data F-DATA. The device driver then sends the F-DATA to the device. It is worth noting that processing by the OS and the device drivers of the write operation in the sequence 304 is precisely the same as for the write operation in the sequence 302.

When the data is received by the device, the detection mechanism 112 in the controller 104 will detect the predetermined sequence of data that constitutes the flag sequence. The extended command component of F-DATA is then handled by the handling mechanism 114. Thus, in this particular embodiment of the invention, when the flag sequence is detected, the data storage device does not perform a write of F-DATA to the specified memory location. Instead, the F-DATA is intercepted and a handling mechanism (e.g., the API-translator 114) is invoked to perform a predetermined function that is specified by the extended command portion of F-DATA. The logic of the handling mechanism 114 can parse the extended command component and access an application platform 106 to perform the predetermined function that is indicated by the extended command. In order to hide the special processing of F-DATA from the host device, the controller 104 can produce a response indicating a successful write operation, thus giving the device drivers in the host the an indication that the write operation was successfully performed.

It is worth noting that since the flag sequence is a triggering mechanism for accessing the enhanced functionality and that data is never really written to the addressed memory location, the address that is specified ADDR can in principle be any arbitrary address. However, it may be more convenient to use a valid address in order to avoid an error condition that might be triggered by the OS as a consequence of inadvertently specifying an illegal address. For example, a given OS might only recognize a certain address range, so the write operation should at least specify an address within that range even though it is ignored in the data storage device. Another OS may not have such a limitation, and so any address can be used.

It can be appreciated from the foregoing description, that in accordance with the present invention, the extended commands which represent the enhanced functions of a memory device can be accessed without having to modify either the OS or the device drivers. By sending special data to the memory device in conjunction with an existing command taken from the command set of the device (e.g., write command): (1) an extended command can be accessed without having to add to the existing command set of the device, and (2) the existing device drivers can therefore be used because there is no change to the command set for which the device drivers were originally written.

In the discussion which follows, the notion of a "memory location window" will be associated with the operating state of the memory device when a flag sequence is detected. One can view the memory device as providing a "window" to the extended commands of the device, including accessing data from "memory locations" in that "window;" hence the term memory location window.

The flag sequence can be any sequence of data. The flag sequence can be a sequence of bits, or bytes, and so on. The flag sequence can be contiguous or not (e.g., the flag might be a sequence of every other bit in the data string). Two or more different flag sequences can be defined, each serving as a triggering mechanism for accessing the enhanced functions. The flag sequence should be long enough to ensure against accidental activation of the memory location window during normal execution of the host application code. For example, a flag sequence that is 8 bytes long, provides odds of one in $2^{64}$ against accidentally triggering the memory location window.

In accordance with this embodiment of the invention, the flag sequence is a predetermined sequence of data; i.e., the sequence length and the byte sequence are predetermined at a time prior to use with the host application. The manufacturer can "hardcode" the flag sequence. Alternatively, a suitable interface can be used to program the flag sequence into the device at some time subsequent to fabrication of the device. For example, vendors who purchase memory devices from the manufacturer can be provided with a software development kit that includes software for programming their own predetermined data sequence into the device.

Instead of using the extended command component of the F-DATA, different flag sequences can be used to trigger different functions in the memory device. In fact, one may view the F-DATA string as a single string that (1) activates access to the enhanced features and (2) specifies the particular function to be accessed.

Continuing with the I/O sequence 304 shown in FIG. 3, execution of the extended command, depending on the command, might produce a result that needs to be returned to the host application 152a, 152b. As can be seen in the sequence 304, a read operation can be performed subsequent to the write operation to retrieve the result.

In accordance with one implementation, the detection mechanism 112 can be designed to assume that a read operation will always immediately follow the write operation that triggers the memory location window. The detection mechanism can pass the read operation to the handling mechanism 114. The result data can be stored in storage that is part of the application platform 106; e.g., in a set of registers or the like. The handling mechanism can access the data and communicate the data to the device drivers as if the read operation was a conventional read operation of the memory component 102. The internal operation of the memory device is completely hidden to the device drivers.

In accordance with an alternative implementation, the application platform can store the result data in a predefined area in the memory component 102 itself. This would simplify the detection mechanism 112 in the controller 104. The detection mechanism would not have to include logic to process a read operation, allowing the control logic 116 to process the read operation just like any other operation. Thus, to retrieve the result, the host software would perform a read operation, specifying the address of the predetermined area in the memory component 102. As a variation of this implementation, one or more additional predetermined areas in the memory component can defined, allowing different commands to use different locations in the memory component.

In accordance with the particular embodiment of the invention described, each time an enhanced function needs to be accessed (performed) a write operation of data comprising the flag sequence and an appropriate extended command is made. Of course, it can be appreciated that a more sophisticated detection mechanism 112 can be implemented. For example, in an alternate embodiment, the flag sequence can place the memory device in a special state of operation (call it, an "extended command mode") so that the flag sequence needs to be written only once. Subsequent write operations can then be made to transmit different extended commands to perform different predetermined operations, and read operations can be used to access any results that might be produced by those operations. The device can be taken out of extended command mode by receiving another flag sequence that is detected by the detection mechanism.

In still another embodiment of the invention, the write address ADDR can be used to trigger the memory window location to access the extended commands, instead of providing an extended command in the data sequence. In an OS environment where host-level applications are provided with an API which allows a host application to write to specific addresses in the memory, the host application can perform a write operation of the flag sequence to a predetermined address. When the detection mechanism 112 detects the flag sequence, it can pass the address to the handling mechanism 114. A predetermined operation (i.e., an extended command) that is associated with the predetermined address can then be invoked. In still yet another embodiment of the invention, the write address ADDR itself can be used to trigger the memory window location, instead of using a predetermined flag sequence.

It is noted that in an OS where specific memory locations cannot be explicitly accessed by a host application, the alternative embodiments of the invention can still be employed. However, since only the OS can issue write and read operations with specific addresses, special API conventions would need to be defined between the host and the OS to signal the OS to use predetermined addresses. These embodiments, therefore, may not be suitable for such an OS, since it would require a modification to some part of the OS.

In another embodiment of the invention, the flag sequence can be enhanced to further reduce the likelihood of inadvertently triggering the memory location window. Immediately following a write operation of the flag sequence, a read sequence can be performed. The controller 104 can be configured to return a predetermined data sequence to indicate that the device recognized a flag sequence in the data. The host can use that information to confirm whether the device is a device with enhanced capability or a simply a legacy device, and proceed accordingly. It can be appreciated that this simple form of handshaking can be further enhanced. Also, the use of a handshaking technique can permit a shorter flag sequence to be used, if necessary.

Figure 4:
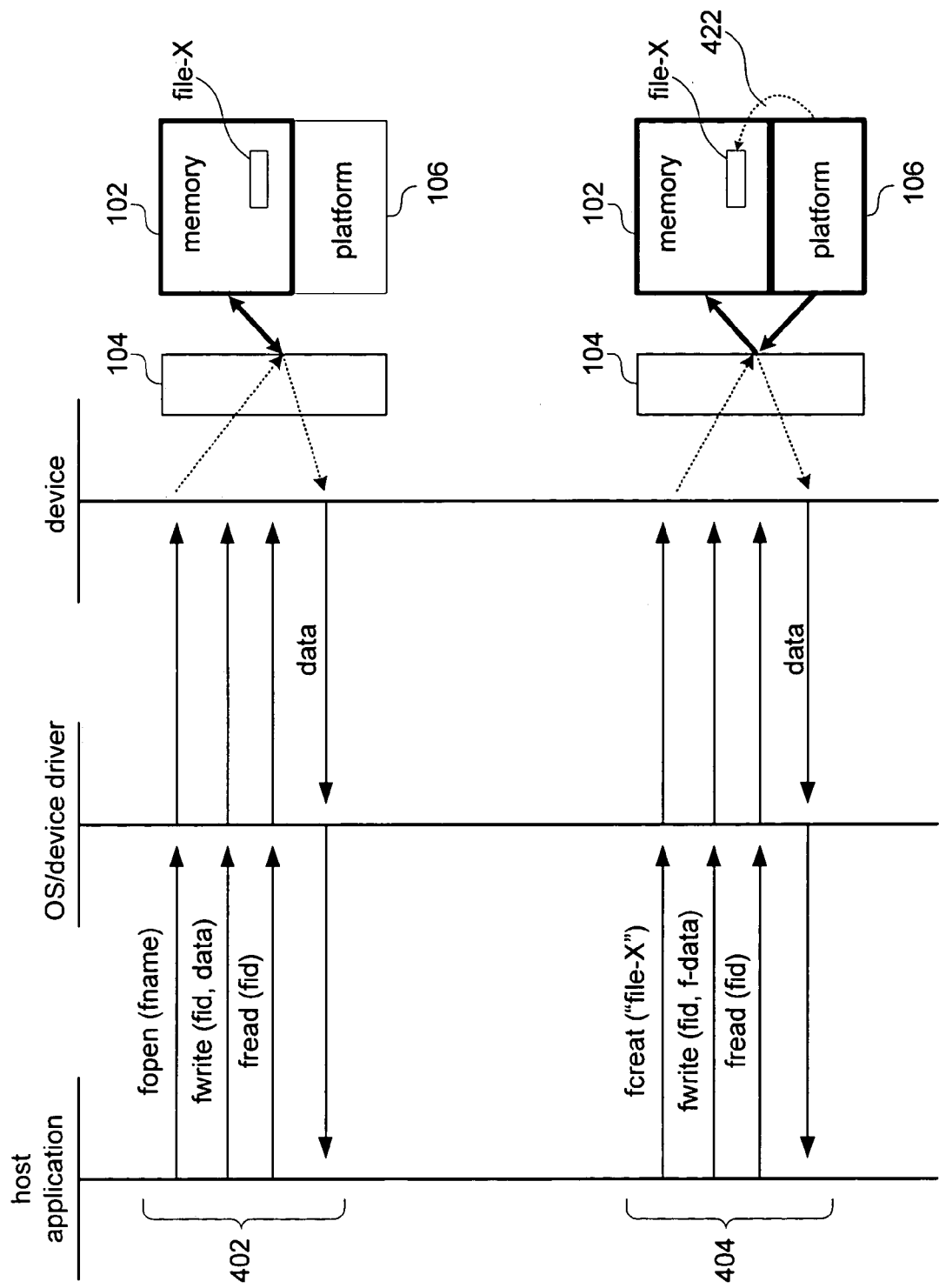
FIG. 4 illustrates an alternate embodiment of the present invention, showing communication sequences for accessing an enhanced memory device.

Referring to FIG. 4, in accordance with another embodiment of the invention the data access model for accessing information contained in the memory device is a file system that is provided by the OS. Thus, a host application 152a makes file I/O calls to the OS. The OS converts the file I/O calls to the lower level data write and data read routines provided by the device driver library.

Consider first a conventional sequence 402 of file operations. A first step typically is for the host application to perform a "file open" operation. Typically, this involves making an appropriate function call to the OS, specifying a filename. FIG. 4 shows a Unix-like system call. Typically, the OS will parse the parameters of the function call and make suitable call(s) to the device driver, which then communicates with the memory device (e.g., disk drive). In the case of a "file open" operation, the OS will typically return some information called a file identifier (fid) which identifies the particular file; e.g., the fid might be an index into a system file table maintained by the OS that stores parameters such as the write location in the memory device for a write operation, a read location for a read operation, and so on.

As indicated by the sequence 402, a "file write" operation with some DATA can then be performed. This will cause the OS to make suitable calls into the device driver library to effect the file write operation. The specific details as to the actions that the OS performs are very much dependent on the particular OS and the device. Assuming the DATA does not contain a predetermined flag sequence, the detection mechanism 112 in the controller 104 of the memory device will not be triggered. Consequently, the controller will proceed to perform the action(s) in the memory device, as directed by the device driver calls from the OS, to write the DATA to the specified file.

A "file read" operation can be performed. This will cause the OS to make suitable calls to the device driver library to perform a read operation from the file. Typically, the data is returned in a buffer that is provided as a parameter in the "file read" system call. In both instances, whether a file write or a file read is performed, data access is performed on the memory component 102 of the device (e.g., magnetic media of a disk drive device). Thus, data is written to a file stored on the memory component, and data is read from a file stored on the memory component.

Consider next an example of a file I/O sequence 404 in accordance with an embodiment of the invention. A first step can be for the host application to make a "file create" command, using a unique file name, say for example, "file-X." This will cause the OS to take the necessary steps to create the specified file in the device. In this particular embodiment of the invention, an actual file will be created in the memory component 102 of the device. Thus, in the case of a disk device, the file system table on the device will show an entry for "file-X." Again, the OS returns a file id, fid, to the host application for subsequent file I/O operations.

Now, suppose a "file write" operation is performed with F-DATA. As in FIG. 3, F-DATA comprises a flag sequence and an extended command, thus:

F-DATA=<flag sequence><extended command>

The OS handles the file write operation in conventional manner; that is, the OS makes the appropriate calls into the device driver library, just as for any file write operation, to communicate the F-DATA to the memory device. The detection mechanism 112 in the controller 104 of the memory device will detect the flag sequence contained in F-DATA. In response to detecting the flag sequence, the F-DATA will be handled by the handling mechanism 114. More specifically, the extended command component of F-DATA will be processed by the handling mechanism.

However, in accordance with this particular embodiment of the invention, the F-DATA will also actually be written to the file "file-X" in the memory component 102. The reason for processing the file write operation of F-DATA is to ensure integrity of the file system. Depending on the OS, file system tables maintained by the OS might track information about data that is written to a file. For example, the OS might keep track of the file size, a checksum value may be computed for each file, and so on. If the controller 104, upon detecting the flag sequence, merely intercepts F-DATA and does not actually write the data to the file system, it is possible the OS file system tables will deviate from what is actually in the file system, thus possibly leading to corruption of the file system. Hence, the "file write" operation of F-DATA is performed, even though its purpose is to invoke one of the extended commands of the enhanced device. Similarly, with reference to the sequence 304 in FIG. 3, the write operation of F-DATA to the specified memory location, in addition to triggering the memory location window, can also be actually performed; if doing so would simplify the design of the controller 104.

Continuing with FIG. 4, processing of the extended command component of F-DATA proceeds as discussed above. The handling mechanism 114 in the controller 104 will dispatch the specified extended command to the appropriate application platform 106 to access the enhanced functionality.

Referring again to the sequence 404 in FIG. 4, a subsequent "file read" operation can then be performed to read any data that might be produced as a result of performing the enhanced function. In one implementation of this embodiment of the invention, the controller 104 can assume that the operation immediately following the write of F-DATA will be a file read operation. Thus, when the OS receives the file read request, the OS will translate the request into one or more read operations on the device. The controller, upon receiving the read request, can then return the data produced by executing the extended command, instead of accessing the contents of the file "file-X."

Alternatively, the data produced by an extended command can be written to the file system, as indicated by the data flow 422. For example, data can be written to "file-X." This allows the host application to access the produced data simply by performing file read operations on "file-X."

One of ordinary skill will readily appreciate that the file (e.g., "file-X") that is used for writing F-DATA will continue to increase each time the extended command set is accessed. In many cases, this is an undesirable effect. In some OS's, the "file create" operation can be invoked with a parameter that will delete the file if it already exists before creating the file. Thus, the example shown in the sequence 404 assumes the "file create" operation deletes an already existing file. In an alternative embodiment, a "file open" can be followed by a system call to remove the file (e.g., unlink() in Unix) upon completion of the extended command. In still another alternative embodiment, the file can be deleted before a file open operation.

The discussion which follows illustrates various aspects of the present by way of an example for accessing enhanced functionality in a data storage device. Suppose, for purposes of explanation, an enhanced memory device is provided which includes a PIN (personal identification code) security feature. More specifically, suppose the enhanced memory device requires that a PIN verification must be performed before access to the card is permitted. For discussion purposes, suppose the following operations are to be performed:

(1) the host application accesses profile information contained the memory device; e.g., user name
(2) the memory device returns the profile information
(3) the host application displays the user name and query the user to enter a PIN
(4) the host application requests a PIN verification of the entered PIN
(5) the memory device compares the entered PIN provided by the host application against the PIN that is stored in the memory device, and returns a positive or negative result As noted above, the API translator layer 154 can provide an interface to the host application in terms of the enhanced functions provided by the memory device. Thus, for example, the host application can be provided with an API call such as "openChannel()" to establish access to the enhanced functionality in the memory device. In the case where the OS provides host level applications with direct access to the memory component 102 of a data storage device, this API might not do anything. In the case where the host application accesses data at a higher level of organization, e.g. a file system, the "openDevice()" API might perform a file open or file create operation.

A function call such as "encrypt()" might be included in the API to give the host application access to an encryption function that is provided in the storage device. The details for performing the encryption function in the storage device can therefore be hidden from the application, thus reducing the effort for developing the host applications.

Following are illustrative examples of API calls that might be provided in the API layer 154. For the purposes of explanation, two data access models will be discussed: low level, direct memory access (data access model 1); and higher level access such as in a file system (data access model 2).

openChannel—establish an access channel to the extended command set of the memory device
  data access model 1—The API may do nothing. When directly accessing memory, as shown in FIG. 3 for example, there typically is no corresponding "open" operation. The memory is simply written to or read from.
  data access model 2—The API can perform a file create operation of a file; for example:
    fid=fcreat("file-X")
  Other details for creating a file, e.g. maintaining a file id (fid), can also be handled in the API. When the file is opened, data can then be subsequently written to it. Alternatively, a file open command can be performed. Additional code may be needed in order to determine whether "file-X" was successfully created or opened.

getProfile—this is an illustrative example of an extended command of the memory device; this function retrieves profile information for a user
  data access model 1—The API implementation might look like:
    write(0×1234, "xxxAccessyyyget-profile-command")
    read(0×2468, buffer)
  a. The string "xxxAccessyyy" is a predetermined flag sequence that triggers the memory location window in the memory device to access the enhanced function, in this case access the user profile. The string "get-profile-command" is a reference to the extended command for retrieving the profile information; of course, a simple number or letter could be used as an identifier of the particular extended command. The text string has the advantage of being self-documenting.
  b. When the string is sent to the memory device via the "write" operation, the detection mechanism 112 in the controller 104 of the memory device can detect the flag sequence in the string and triggers the memory location window. The extended command would then be handed to the handling mechanism 114, where appropriate processing can be performed by the application platform 106. In this case, the application platform might simply locate the information, or it might load the information into a register, or it might load the information in a predefined location in the memory component 102, or otherwise make available the profile information. Note—the address provided in the write operation is ignored.
  c. When the "read" operation is performed, the memory device will retrieve the profile information (e.g., from a register) and communicate the data back to the device drivers. The OS will then move the data into the "buffer." If a predetermined memory location in the memory component 102 is used to contain the profile information, then the read command would include the address of the predetermined memory location; otherwise, the address is ignored.
  d. The API can then return the content of the buffer to the host application, having hidden the details of how the data was obtained by way of the API call.
  data access model 2—The API implementation might look like:
    fwrite(fid, "xxxAccessyyy get-profile-command")
    fread(fid, buffer)
  a. Assuming an openChannel() API call was previously made, the file is in an open state for writing and for reading.
  b. The OS will convert the fwrite() function call into appropriate low level write operation(s) to the memory device. Processing in the memory device proceeds essentially as discussed above. The user profile information is made available in a register, or it can be written to the actual file (i.e., "file-X").
  c. In addition, the memory device may be configured to perform an actual write operation to the file in order to avoid corrupting the file system.
  d. The OS will convert the fread() function into an appropriate low level read operation(s) to the memory device. The file read operation made to the memory device can be intercepted by the detection mechanism 112 and the data can be provided via the handling mechanism 114 and application platform 106. Or, if the application platform 106 dumped the user profile into the file "file-X", then the read operation can be directed to the file itself.
  e. Data communicated from the memory device is then moved into the "buffer" as discussed above.

verifyPIN—this is an illustrative example of another extended command of the memory device; this function compares a PIN provided by the host with a PIN stored in the memory device and returns a response indicating a match or not;the host application provides a PIN that is passed to this API call
  data access model 1—The API implementation might look like:
    write(0×1234, "xxxAccessyyy verify-PIN-command ILoveLucy")
    read(0×2468, buffer)
  a. The sequence "xxxAccessyyy" triggers the memory location window in the memory device to access the enhanced function, in this case perform a PIN verification. The string "verify-PIN-command" identifies the extended command for performing the verification.
  b. The data also includes the user's PIN "ILoveLucy" that was passed to this API call. This example illustrates that the host application can communicate with the enhanced functionality of the memory device by including the communication (e.g., "ILoveLucy") as part of the data to be sent to the device. If large amounts data need to be sent, a convention can be defined whereby multiple write operations can be performed.

c. When the string is sent to the memory device via the "write" operation, the detection mechanism 112 in the controller 104 of the memory device can detect the flag sequence in the string and triggers the memory location window. The extended command would then be handed to the handling mechanism 114, where appropriate processing can be performed by the application platform 106. In this case, the application platform will compare the host-provided PIN against a PIN that is stored in the memory device. The application platform can then store a suitable response, e.g. PASS, FAIL, in a register or a predefined location in the memory 102.

d. When the "read" operation is performed, the memory device will retrieve the profile information (e.g., from a register) and communicate the data back to the device drivers. The OS will then move the data into the "buffer." If a predetermined memory location in the memory component 102 is used to contain the profile information, then the read command would include the address of the predetermined memory location; otherwise, the address is ignored.

e. The API can then return the content of the buffer to the host application, having hidden the details of how the data was obtained by way of the API call.

data access model 2—The API implementation might look like:
fwrite(fid, "xxxAccessyyy verify-PIN-command ILoveLucy")
fread(fid, buffer)

a. The OS will convert the fwrite() function call into appropriate low level write operation(s) to the memory device. Processing in the memory device proceeds essentially as discussed above. The result of the comparison is made available, either via a register or by writing the result to the actual file (i.e., "file-X").

b. In addition, the memory device may be configured to perform an actual write operation to the file in order to avoid corrupting the file system.

c. The OS will convert the fread() function into an appropriate low level read operation(s) to the memory device. The file read operation made to the memory device can be intercepted by the detection mechanism 112 and the data can be provided via the handling mechanism 114 and application platform 106. Or, if the application platform 106 dumped the user profile into the file "file-X", then the read operation can be directed to the file itself.

d. Data communicated from the memory device is then moved into the "buffer" as discussed above.

closeChannel—closes the access channel to the extended command set of the memory device data access model 1—The API may do nothing. When directly accessing memory, as shown in FIG. 3 for example, there typically is no corresponding "close" operation. The memory is simply written to or read from.

data access model 2—The API can perform the following:
unlink(fid)
This Unix system call deletes the file from the file system. Similar system calls are provided in other OS's. By deleting the file, "file-X", needless cluttering of the file system can be avoided.

With the foregoing API layer definition, the host application might contain the following program fragment to obtain and verify a user's PIN:

:
openChannel();
getProfile(buffer);
/* the next two subroutines interact with a user to obtain a PIN */
display_name(buffer);
obtain_PIN(p_buffer);
result=verifyPIN(P-buffer);
:

Recall that in an alternative embodiment of the invention, the flag sequence can operate to place the memory device in an "extended command mode," where subsequent data writes to the memory device perform various enhanced functions. The above API calls can then be implemented in the following manner. Again, both data access models are described.

openChannel—establish an access channel
data access model 1—The API might look like:
write(0×1234, "xxxAccessyyy")
This places the memory device in the extended command mode.
data access model 2—The API can perform a file create operation of a file; for example:
fid=fcreat("file-X")
fwrite(fid, "xxxAccessyyy")
In addition to placing the memory device in the extended command mode, the string "xxxAccessyyy" can be written to the file, in order to avoid corrupting the file system.

getProfile—retrieves profile information for a user
data access model 1—The API implementation might look like:
write(0×1234, "get-profile-command")
read(0×2468, buffer)
data access model 2—The API implementation might look like:
fwrite(fid, "get-profile-command")
fread(fid, buffer)
Note that the string "get-profile-command" can be written to the file, in order to avoid corrupting the file system.

verifyPIN—verifies PIN
data access model 1—The API implementation might look like:
write(0×1234, "verify-PIN-command ILoveLucy")
read(0×2468, buffer)
data access model 2—The API implementation might look like:
fwrite(fid, "verify-PIN-command ILoveLucy")
fread(fid, buffer)
Note that the string "get-profile-command" can be written to the file, in order to avoid corrupting the file system.

closeChannel—closes the access channel
data access model 1—The API might look like:
write(0×1234, "xxxCloseAccessyyy")
This is a second predefined flag sequence that takes the memory device out of the extended command mode.
data access model 2—The API can perform the following:
fwrite(fid, "xxxCloseAccessyyy")
unlink(fid)
This Unix system call deletes the file from the file system. Similar system calls are provided in other OS's. However, before deleting the file, the memory device needs to be taken out of the extended command mode. This is accomplished by the fwrite() system call.

Figure 5:
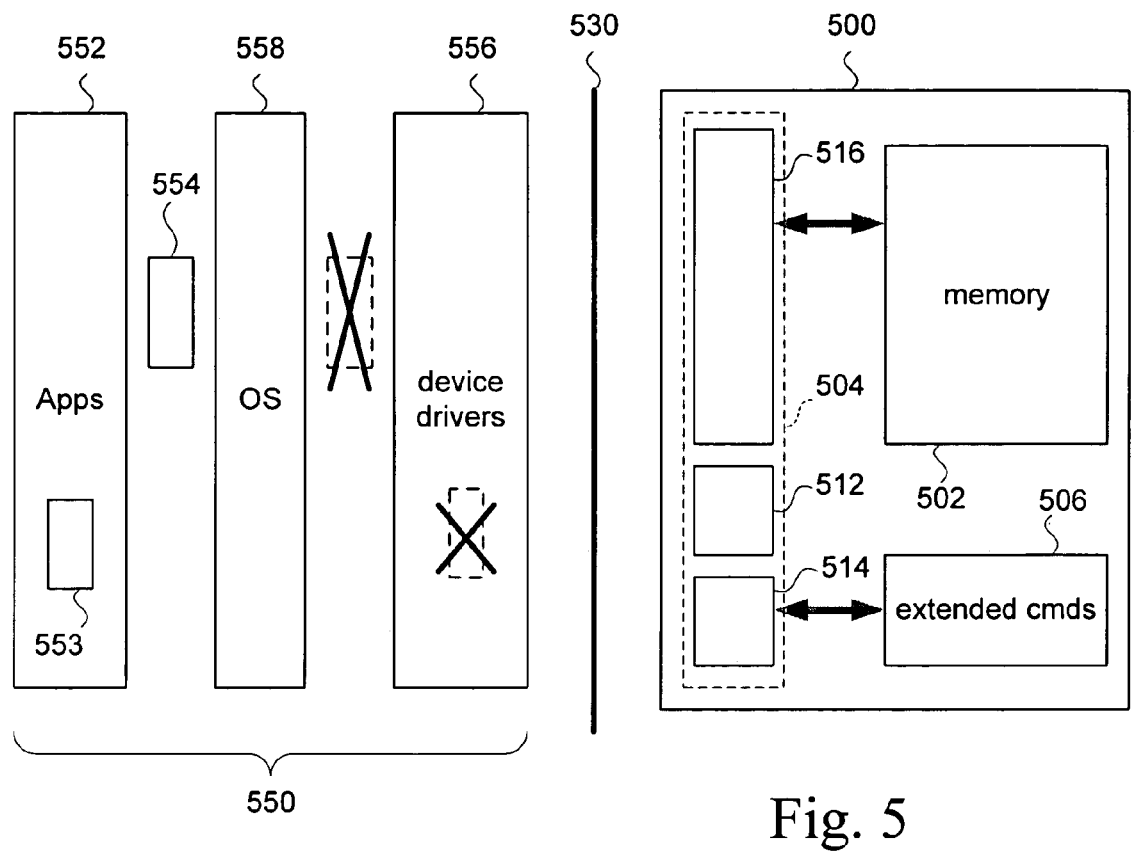
FIG. 5 illustrates a system architecture for deploying an enhanced memory device in accordance with the present invention.

Referring to FIG. 5, the generalized block diagram illustrates how an enhanced data storage device 500 can be introduced to a host device 550 in accordance with aspects of the present invention. The interface 530 represents both the pinouts or connectors provided in the storage device, and the bus or slot that is provided in the host device to which the storage device is connected.

For this discussion, it is assumed that the memory component 502 and the controller 504, comprising only the control logic 516, constitute components which comprise a legacy memory device. Enhanced features added to the device then are represented by the additional logic and/or processing capability 506 that implement the enhanced features. Also, the controller 504 is expanded to include logic for the detection mechanism 512 and logic for the handling mechanism 514. From a different point of view, the memory device can be seen as comprising a memory component for storing data and a control component which encompasses all the logic that participates and transferring the data to and from the memory component.

Host applications 552 on a host device 550 are modified with additional code 553 to utilize the enhanced features. An API 554 can be provided to simplify the development of the host applications, by hiding some of the data communication details used to access the enhanced features.

Figure 6:
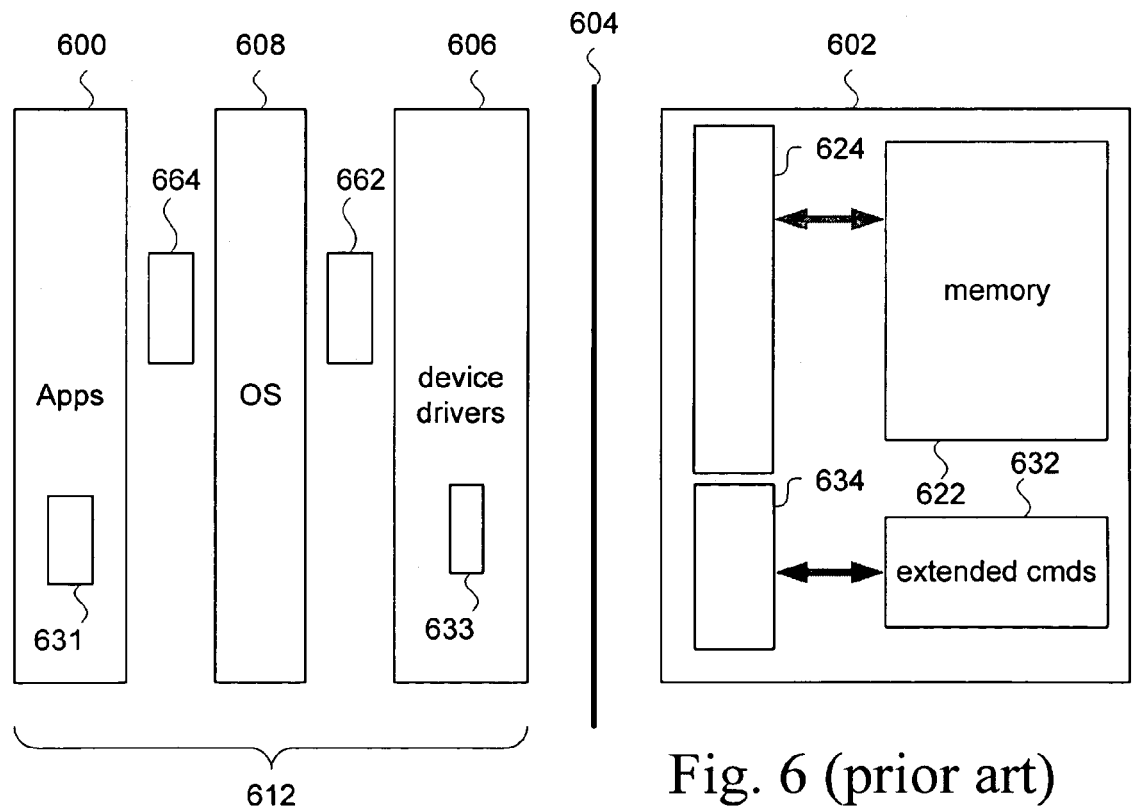
FIG. 6 shows a conventional system architecture for deploying an enhanced memory device.

The detection mechanism 512 and the handling mechanism 514 of the present invention avoid the need for new or modified device driver code 662, 633 (FIG. 6) in the device driver library, even though the feature set of the memory device has been increased. The present invention allows the OS and device drivers to use the existing command set that was originally defined in the legacy device (e.g., write and read operations) to access an extended command set in the enhanced device to perform the enhanced functionality. Hence, the additional functionality 662, 633 that must be provided in conventional devices is not needed in a device according to the present invention. Consequently, there is no need for modifications to be made to the device drivers in the OS 558 since, from the point of the OS there is no new functionality to implement. Thus, when a vendor is ready to release a storage device with enhanced capability, the customer need only obtain updated host-level applications. The customer's existing OS and device drivers remain unchanged.

From the foregoing, it can be appreciated that a basic aspect of the invention is to use the command set of the legacy device to perform the added functionality provided in enhanced device. The embodiments disclosed above employ a special data sequence, namely, a predetermined flag sequence to trigger the memory location window In accordance with another embodiment of the invention, the memory location window can be triggered by issuing a unique sequence of operations to the memory device. For example, three write operations followed by four read operations could serve to trigger access to the enhanced functionality in an enhanced memory device. Different sequences can trigger different functions. Data that is produced by the enhanced functions can be stored to a predetermined area of the memory component 102 and accessed by a conventional read operation. This is a rather cumbersome embodiment and involves more complex logic in the memory device, but nonetheless embodies the salient aspects of the present invention.

Figure 1A:
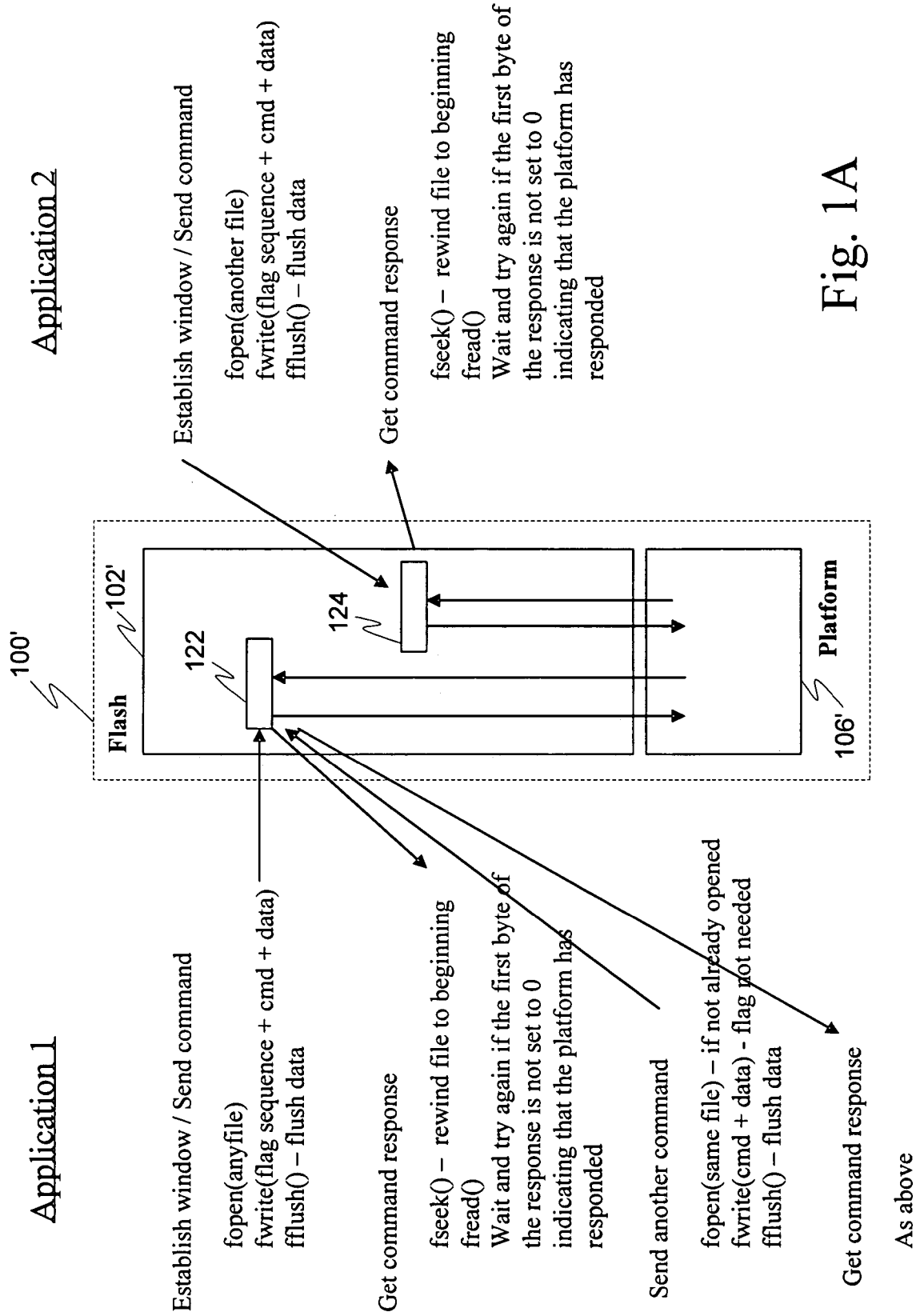
FIG. 1A shows an illustrative embodiment of the present invention in a flash memory device.

Referring to FIG. 1A, a flash memory device 100' is an example of an implementation of the architecture shown in FIG. 1. The device comprises a memory component 102' and a platform 106' which represents logic/firmware for providing enhanced functionality. It is understood that suitable controller logic of the present invention is also provided but not shown to simplify the discussion. The figure illustrates an aspect of the invention wherein multiple host applications (Application 1, Application 2) can concurrently access the enhanced functionality of the device.

Application 1 accesses a first memory location window 122 by making an "fopen()" system call of a file. The application then makes an "fwrite()" call to send the flag sequence and extended command (along with any related data) to the device 100'. The file system in the OS will eventually make a call (via the device drivers for the flash memory device) to write this data to a location in the memory 102', which is "remembered" by the controller (not shown). Some assumptions are made to simplify the discussion of operation. First, it is assumed that all the data fits into one contiguous block (e.g., 512 bytes). The file system will not automatically defragmented or reallocated the data during a session. A checksum is provided to ensure data integrity. Additional handling may be provided if these assumptions do not hold for a particular implementation. More generally, it can be appreciated that specific provisions may have to be implemented to accommodate the peculiarities for any given OS or file system. However, such additional considerations are well within those of ordinary skill in the relevant art.

Continuing, Application 1 may make a "fflush()" system call. Depending on the file system, the "fwrite()" might be buffered in the OS. The "fflush()" system call forces the OS to write the data to the device. When the controller in the device 100' detects the flag sequence, the extended command and any related data will be communicated to the platform 106' to perform the extended function indicated by the extended command. If response data is produced as a result of performing the extended command, the platform logic/firmware can be provided with the address of the memory location window 122, so that the data can be written to it. As mentioned above, it is assumed that the file system will not defragment otherwise relocate the memory allocated to its files. Otherwise, the platform 106' may not know where to write its response data. In such a situation, the controller will require additional intelligence in order to detect such reallocations, if it is possible.

Continuing, Application 1 can make an "fseek()" system call to "rewind" the file to the beginning. An "fread()" system is then made to read the response data from the memory location window 122. Depending on the OS, the file may have to be closed in order to ensure that the OS will not read any data from its internal buffers. In order to distinguish whether the data read from the file is response data versus some other data (for example, the other data might be data from the flag sequence and extended command), a convention can be established that all response data is preceded by a special sequence of one or more bytes; e.g., the first byte is zero. Thus, the "fseek()" and "fread()" sequence can be repeated one or more times if needed in order to guarantee that the data read is the response data from the platform 106'. The response data can be a simple acknowledgement that the function has been performed.

Application 1 can make a subsequent series of similar system calls to access other functions that might be provided by the platform 106'. The application may have to perform an "fopen()" system call on the same file. Alternatively, the application can open a different file to access a different memory location window.

FIG. 1A also shows that another application running on the host, Application 2, can access the enhanced functions of the memory device 100' at the same time as Application 1. Application 2 opens a file different from the file that is opened by Application 1 in order to establish a second memory location window 124. Application 2 can then make an "fwrite()" system call to access a desired function provided by the platform 106' by writing a flag sequence and an appropriate extended command. As mentioned above, Application 2 may need to make an "fflush()" system call in order to force the OS to send the data to the memory device 100'.

When the controller (not shown) in the device 100' detects the flag sequence, the remaining data can be communicated to the platform 106' for processing. This may include communicating the address of the memory location window 124 to allow the platform to write any response data that might be produced.

Any response data that may be produced can be obtained by Application 2 by reading the file. As with Application 1, this may include making an "fseek()" to reset the file pointers in the file system to the beginning of the file, effectively "rewinding" the file to the beginning. Also, as in Application 1, a sequence of "fread()" and "fseek()" operations may need to be performed until the platform 106' produces the data.

What is claimed is:

1. An access method in a storage device comprising:
   receiving received data in connection with a first operation on the storage device;
   performing the first operation if a predetermined data sequence in the received data is not detected; and
   performing a predetermined operation that is not the first operation in response to detecting the predetermined data sequence in the received data,
   wherein the first operation is a write operation, wherein performing the first operation includes storing the received data in a memory component of the storage device,
   wherein the received data comprises an address portion and a data portion, wherein the data portion comprises the predetermined data sequence,
   wherein the data portion further comprises a command identifier that identifies the predetermined operation.

2. The method of claim 1 further comprising performing the first operation in addition to performing the predetermined operation, in response to detecting the predetermined data sequence in the received data.

3. The method of claim 1 wherein the predetermined operation is performed instead of the first operation, in response to detecting the predetermined data sequence in the received data.

4. The method of claim 1 wherein the received data further includes a second data sequence in addition to the predetermined sequence, wherein the predetermined operation is indicated by the second data sequence.

5. The method of claim 1 wherein performing the predetermined operation produces result data.

6. The method of claim 5 further comprising receiving a read operation on the storage device and producing the result data in response to the read operation.

7. The method of claim 6 wherein the step of producing result data includes storing the result data in a memory component of the storage device at a predetermined location in the memory component, wherein the read operation includes address information indicative of the predetermined location.

8. The method of claim 1 wherein performing the predetermined operation produces result data that is stored in a data store other than the memory component.

9. The method of claim 1 wherein performing the predetermined operation produces result data that is stored in the memory component.

10. A storage device having a memory component and a control component, the control component configured to operate according to the method of claim 1.

11. The storage device of claim 10, wherein the control component is further configured to communicate with a computing device.

12. An access method in a storage device comprising:
    receiving received data in connection with a first operation on the storage device;
    performing the first operation if a predetermined data sequence in the received data is not detected; and
    performing a predetermined operation that is not the first operation in response to detecting the predetermined data sequence in the received data,
    wherein the first operation is a write operation, wherein performing the first operation includes storing the received data in a memory component of the storage device,
    wherein the received data comprises an address portion and a data portion, wherein the address portion comprises the predetermined data sequence,
    wherein the data portion comprises a command identifier that identifies the predetermined operation.

13. A method for accessing a storage device comprising:
    communicating a first write operation to a storage device, the first write operation having associated therewith first data comprising address data and write data, wherein the write data is written to a memory location of a memory indicated by the address data;
    communicating a second write operation to the storage device, the second write operation having associated therewith second data comprising a predetermined data sequence, wherein the storage device performs a predetermined operation other than a write operation in response to detecting the predetermined data sequence; and
    communicating a read operation subsequent to the second write operation,
    wherein the predetermined operation produces result data,
    wherein the storage device responds to the read operation with the result data,
    wherein the step of communicating a first write operation is performed in response to performing a first write operation to a file, the step of communicating a second write operation is performed in response to performing a second write operation to the file, and the step of communicating a read operation is performed in response to performing a read operation on the file.

14. The method of claim 13 wherein the steps of performing a second write operation to the file and performing a read operation on the file are performed in response to making an API (application programmer's interface) call to perform the predetermined operation in the storage device.

15. The method of claim 14 wherein the steps of making an API call, performing a second write operation to the file, and performing a read operation on the file are performed by program code which comprise one or more program code portions of an application.

16. The method of claim 15 wherein the step of communicating a first write operation, communicating a second write operation, and communicating a read operation are performed by program code which comprise one or more program code portions of an OS (operating system).

17. The method of claim 13 wherein the storage device is configured to perform a plurality of predetermined operations.

18. The method of claim 17 wherein the second data further comprises a command data sequence that is indicative of the predetermined operation.

19. The method of claim 17 wherein the second data further comprises address data, wherein the predetermined data sequence constitutes the address data.

20. The method of claim 13 wherein the result data is stored in a data store other than the memory.

21. The method of claim 13 wherein the result 2 data is stored beginning at a predetermined location in the memory.

22. A method for accessing a data storage device comprising:
communicating an indication to the data storage device to perform a first operation, the first operation being one of a plurality of first device operations;
communicating first data to the data storage device, the first data being associated with the first operation;
determining whether to perform at least a second operation based on data contained in the first data, the second operation being exclusive of the plurality of first device operations.
wherein the data, storage device has a corresponding command set associated with the first device operations, wherein the second operation is not associated with any commands in the command set, wherein the step of communicating an indication is a step of communicating a command from the command set.

23. The method of claim 22 wherein the data storage device has only a single corresponding command set.

24. The method of claim 22 further comprising performing the second operation instead of the first operation if the first data contains a predetermined sequence of data.

25. The method of claim 22 further comprising performing the second operation in addition to performing the first operation if the first data contains a predetermined sequence of data.

26. The method of claim 22 wherein the first operation is a write operation and the first data is data to be written by the write operation.

27. The method of claim 22 wherein the steps of communicating include asserting signals on one or more signal lines of the data storage device.

28. The method of claim 22 wherein the steps of communicating include transmitting data over one or more data lines of the data storage device.

29. A method of accessing a storage device comprising:
providing a plurality of first operations in the storage device, each first operation having an associated command, thereby defining a command set;
providing a plurality of second operations in the storage device, the command set being absent any commands that are associated with the second operations;
communicating to the storage device a command associated with one of the first operations, including communicating data associated with the command;
detecting a predetermined data sequence in the data associated with the command, and in response thereto, performing one of the second operations; and
if the data associated with the command is absent the predetermined data sequence, then performing one of the first operations associated with the command.

30. The method of claim 29 wherein performing one of the second operations produces result data.

31. The method of claim 29 wherein the data associated with the command includes data indicative of one of the second operations.

32. The method of claim 31 wherein the command is a write command.

33. The method of claim 31 wherein one of the first operations is associated with the command, the method further comprising performing the associated first command in addition to performing one of the second operations.

34. The method of claim 29 further comprising communicating a subsequent command to the storage device, the subsequent command having data associated therewith, wherein the data is indicative of one of the second operations.

35. The method of claim 29 wherein performing the second operation produces result data, the method further comprising communicating a subsequent command that is indicative of a read operation, detecting the subsequent command and in response thereto responding with the result data.

36. The method of claim 35 wherein the steps of communicating are performed by executing first computer program code.

37. The method of claim 36 wherein executing the first program code is performed in response to executing second program code.

38. The method of claim 37 wherein the first program code is a constituent part of an operating system, wherein the second program code is a constituent part of an application program.

39. A storage device comprising:
a memory component having a corresponding command set;
a control component operatively coupled to the memory component for writing data to the memory component and for reading data from the memory component; and
an interface operably coupled to the control component and configured for communication with a host device,
the control component configured to perform a plurality of device operations and a plurality of extended operations, wherein each of the device operations is associated with a command in the command set,
the control component further configured to detect commands communicated from a host device wherein the device operation associated with a communicated command can be performed,
the control component further configured to detect a predetermined sequence of data in first data associated with a first command from the command set, and to perform one of the extended operations in response to detecting the predetermined sequence of data.

40. The device of claim 39 wherein the extended operations do not have associated commands in the command set.

41. The device of claim 39 further comprising a data store, wherein at least one of the extended operations generates result data that can then be stored in the memory component.

42. The device of claim 39 wherein at least one of the extended operations generates result data, wherein the control component is further configured to store the result data beginning at a predetermined location in the memory.

43. The device of claim 39 wherein the first command is a write command and the first data comprises an address portion and a data portion.

44. The device of claim 43 wherein the data portion comprises the predetermined sequence of data and an extended command specifier, wherein the control component is further configured to perform one of the extended operations based on the extended command specifier.

45. The device of claim 43 wherein the address portion comprises the predetermined sequence of data and the data portion comprises an extended command specifier, wherein the control component is further configured to perform one of the extended operations based on the extended command specifier.

46. The device of claim 39 wherein the control component is further configured to perform a device operation corresponding to the first command in addition to performing the extended operation in response to detecting the predetermined sequence of data.

47. The device of claim 39 the extended operation is performed instead of performing a device operation corresponding to the first command in response to detecting the predetermined sequence of data.

48. The device of claim 39 wherein the control component comprises a controller and one or more processing units, the one or more processing units configured to perform the extended operations, the controller comprising logic to detect the predetermined sequence of data, the controller operatively coupled to operate the one or more processing units to perform an extended operation in response to detecting the predetermined sequence of data.

49. A host device configured to communicate with the storage device of claim 39 comprising first software for communicating one or more of the commands to the storage device.

50. The host device of claim 49 further comprising second software for performing file input and file output operations, wherein the first software communicates one or more of the commands to the storage device in response to the file input and file output operations.

* * * * *